Feb. 4, 1958  C. BAREL  2,822,487
METHODS OF MANUFACTURE OF ELECTRIC MOTORS, AND
IN MOTORS MADE THEREBY
Filed July 23, 1954
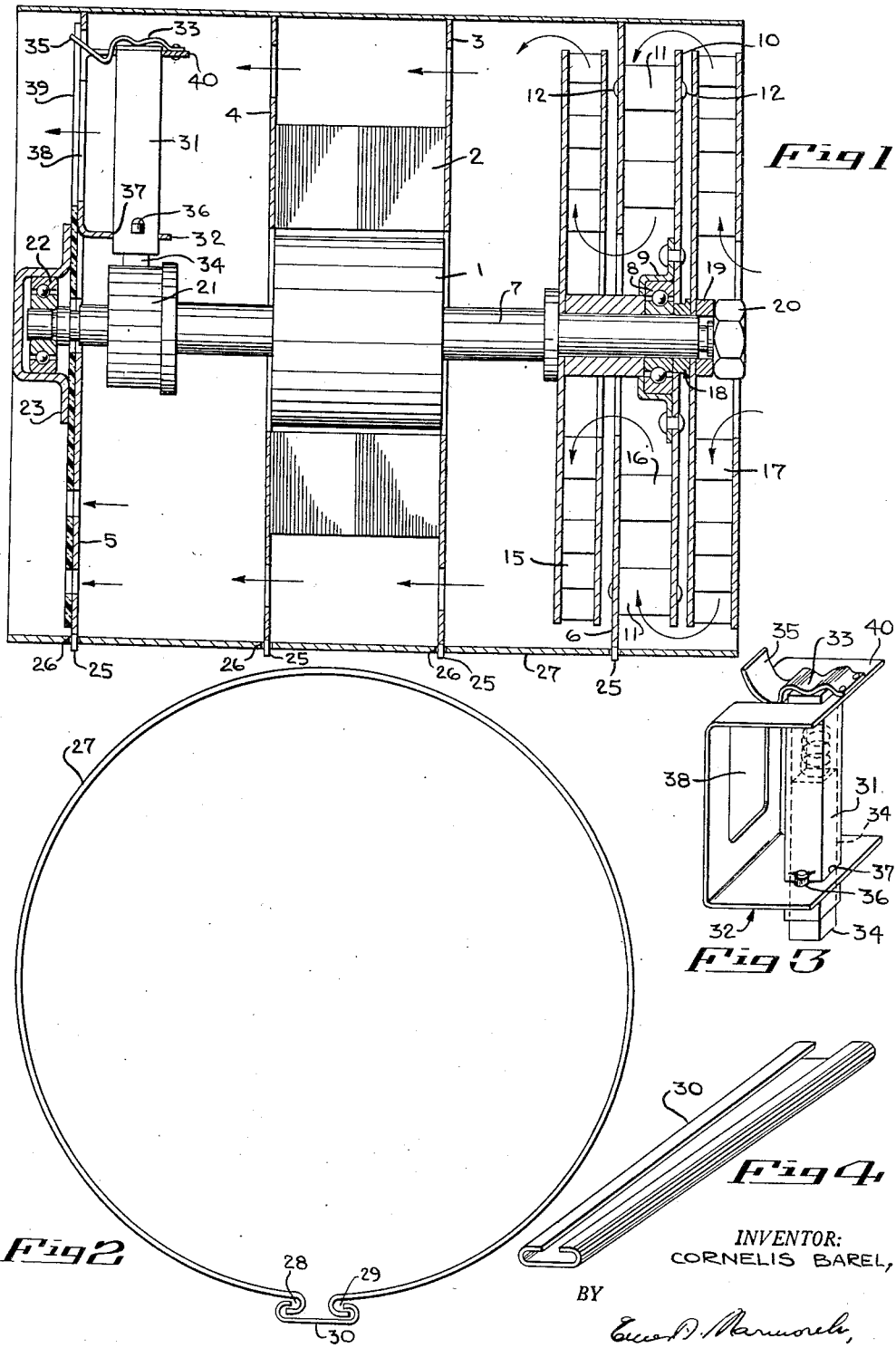
INVENTOR:
CORNELIS BAREL,
BY
HIS AGENT.

United States Patent Office 2,822,487
Patented Feb. 4, 1958

2,822,487

METHODS OF MANUFACTURE OF ELECTRIC MOTORS, AND IN MOTORS MADE THEREBY

Cornelis Barel, Leidschendam, Netherlands, assignor to Rudolf Blik Electrische Apparaten-en Metaalwarenfabriek N. V., The Hague, Netherlands Application July 23, 1954, Serial No. 445,431

8 Claims. (Cl. 310—258)

Hitherto when manufacturing an electric motor a cast, drawn or pressed motor housing was generally used which was divided and then after the rotor had been mounted on the shaft and the other units had been assembled the stator was fastened on the one section of the housing, after which the other section of the housing was fixed to the first stator housing referred to, for instance by means of screws or fixing devices of this type. The housing sections must be machined very accurately, as when the sections of the housing are assembled the rotor must thereby be correctly centred in relation to the stator, and there must be sufficient clearance between the parts in question.

The boring and machining of the centre aperture and, for instance, of the bearings of the rotor and the centring edges for the stator must be carried out on very high precision machine tools. It is evident that such a method proves very costly and the final product is consequently rather expensive.

The invention aims at providing a method of manufacture of an electric motor, in which no such expensive apparatus has to be used, and also in which the assembly time can be shortened considerably.

The invention derives from the observation that if a number of circular plates having the same diameter are arranged parallel to one another and are centred with their outer circumference, the mid-points of these plates will lie in a straight line. Therefore if components are mounted on these plates, centred in relation to the outer circumference of the plates and these plates are centred in the manner described, then the components which are on the plates will be centred automatically. It is thus possible to produce an electric motor in which it is possible to dispense with a cast, drawn or pressed housing as used hitherto, and the rotor, stator and other essential components can be mounted on circular plates and centred in relation to the outer circumference of these plates, so that if these plates are arranged parallel to one another and are centred with their outer circumference the components fitted on to the plates will be centred automatically.

For the purpose of such centering, it is preferable to use a roller sleeve, in respect of which the plates can be centred. Fixing slots are provided along the circumference of this sleeve, at a distance which corresponds to the distance which is desired between the plates, and the plates themselves are provided with protruding lugs which can be inserted into the slots mentioned. The rolled sleeve, which is by nature cylindrical, is open at the beginning, and after the plates have been mounted in the slots referred to above, it is drawn close.

In the annexed drawing a diagram is given of an example of an electric motor made in accordance with the invention, by means of which diagram the invention will be described in greater detail.

The example shown in the drawing is a vacuum cleaner motor, but the invention is not restricted to this type of motor.

In the drawing,

Fig. 1 is a longitudinal sectional view of a motor in accordance with the invention, Fig. 2 is a front elevation of a cylindrical sleeve in which the components of the motor can be assembled, Fig. 3 is a perspective view of the brush holder held in the brush holder bracket, and Fig. 4 is a perspective view of a tapering strip for pulling and holding together the sleeve ends.

The motor in accordance with the invention consists of a rotor 1 and the stator 2. The stator 2 is mounted on circular plates 3 and 4, for example by means of rivets or other means and is centred in relation to the outer circumference of the circular plates 3 and 4. This riveting can be carried out, for instance, by means of a suitable apparatus in such a way that the centring which is intended is properly ensured.

Besides the circular plates 3 and 4, there are also used in the example illustrated circular plates 5 and 6. The shaft 7 of the rotor 1 is housed at one end in the bearing 8, which is enclosed in the bearing housing 9, which is fastened to the plate 10 by means of rivets or other means. The plate 10 is fastened to plate 6 by means of spacer units 11, for instance by using rivets 12 or other known methods of fixing. The fastening of the bearing housing 9 onto the plate 10 and of the plate 10 onto the plate 6 is effected centrally in respect of the outer circumference of the circular plate 6, so that in this way the connecting parts 11 and the bearing housing 9 are centred in relation to the outer circumference of the plate 6.

On the shaft 7 a sleeve 13 is fitted, by means of which a fan 15 can be fastened between the collar or widening 14 and the bearing housing 9. Between the plates 6 and 10 vanes 16 are arranged, while the fan 17 is mounted according to a known method on the shaft 7 with the packing 18, the washer 19 and the nut 20. Near the other end, the shaft 7 carries a collector 21, whilst the end of the shaft is housed in ball-bearing 22, which is contained in the bearing housing 23. The bearing housing 23 is fastened onto the plate 5 in the method mentioned above, for instance by being centrally riveted. Plates 5, 4, 3 and 6 have lugs on their circumferences, which are designated 25, and these lugs are inserted in the slots 26 in a rolled sleeve 27. When the sleeve 27 is tightened around the plates 3, 4, 5, and 6, the parts fastened onto the plates 5, 4, 3 and 6 are thus centred in respect to one another. The plates may be stamped out, so that their uniformity, at least so far as their circumference is concerned, can be ensured. On plate 5 a plate 24 made of insulating material is fitted, and on this plate 24 the electrical connections are arranged.

The rolled sleeve 27, which is open originally, is provided with flanged parts or sleeve sections 28 and 29 on its longitudinal edges (see Fig. 2) and by means of a tapering strip 30 (Fig. 4) with flanged edges it is possible to pull the sleeve sections 28 and 29 together. In this case the sleeve sections 28 and 29 in question are accordingly oblique.

A bracket 32 is riveted to the insulating plate 24. The bracket 32 is C-shaped, and has a bottom opening 37 of non-circular contour, and has a slot 38. The slot 38 extends from the side part, adjacent a slot 39 of the plate 24, to the top part 40 of the bracket 32. On the top part 40, there is fitted a spring catch 33 that has a projecting part 35.

The brush holder 31 has a non-circular contour that matches that of the opening 37, and extends through the opening 37. The matching non-circular contours prevent any turning of the bracket 31 in the opening 37. One or more bosses 36 are connected to the brush holder 31 to limit the extent of protrusion of the holder 31 into the opening 37.

When emplaced, the catch 33 holds the holder 31 in position in the slot 38 and the opening 37, so that the holder 31 is disposed radially of the collector 21 thereby putting the brush 34 into engagement with the collector 21.

To remove the holder 31, the operator will raise the projecting part 35, and reach through the slots 39 and 38 and grasp the holder 31. He will then lift the holder 31 out of the opening 37 and remove it through the slots 38 and 39.

I claim:

1. In an electric motor having a stator and a rotor, in combination, a series of plates having the same substantially circular circumferential shape, said stator being mounted concentrically on some of said plates, said rotor being mounted concentrically on other of said plates, a rolled sleeve surrounding said plates, said sleeve being tightenable and before tightening having internally a non-circular shape and upon tightening assuming internally the shape of said plates and being operable thereby to align said plates, and means releasably connected to said sleeve and actuatable for tightening the sleeve, said sleeve having slots formed in its wall spaced from each other, each plate including a lug operable to penetrate through, and to engage, a slot for spacing the plates apart from each other inside said sleeve.

2. In an electric motor having a stator and a rotor, in combination, a series of plates having the same substantially circular circumferential shape, said stator being mounted concentrically on some of said plates, said rotor being mounter concentrically on other of said plates, a tightenably adjustable rolled sleeve surrounding said plates aligning the same coaxially, means releasably connected to said sleeve and operable to tighten the sleeve around the circumferential surfaces of said plates, and positioning means between said plates and said sleeve and operable for positioning said plates spaced from each other within said sleeve.

3. In an electric motor, as claimed in claim 2, said sleeve being rolled from a band.

4. In an electric motor, as claimed in claim 2, said sleeve having divisions parallel of the sleeve axis and being operable to be drawn tight into substantially cylindrical form onto the circumferential surfaces of the plates.

5. In an electric motor, as claimed in claim 2, together with, said positioning means comprising said sleeve having slots formed in its wall spaced from each other, each plate including a lug operable to penetrate through, and to engage, a slot for spacing the plates apart from each other inside said sleeve.

6. In an electric motor, as claimed in claim 2, said stator being riveted onto its plates, and the rotor including journal bearings each riveted to one of the said other plates.

7. In an electric motor, as claimed in claim 2, together with, an insulating plate connected to one of said other plates on which the rotor is mounted, said insulating plate including parts for conducting electric current to the motor, said parts comprising brush holders disposed adjacent said rotor.

8. In an electric motor, as claimed in claim 2, said rotor including journal bearings secured to said other plates, an insulating plate secured to one of the said other plates relative to which the rotor is journalled, said insulating plate including a bracket, a brush holder removably connected to said bracket urging a brush in a direction towards the axis of said rotor, and resilient means connected to said bracket releasably maintaining said brush holder in position.

References Cited in the file of this patent

UNITED STATES PATENTS

| 720,307 | Wood | Feb. 10, 1903 |
| 1,194,232 | Raymond | Aug. 8, 1916 |
| 2,253,191 | Morrill | Aug. 19, 1941 |
| 2,523,520 | Reinhard | Sept. 26, 1950 |
| 2,701,318 | Feiertag | Feb. 1, 1955 |

FOREIGN PATENTS

| 609,935 | Great Britain | Oct. 8, 1948 |
| 542,272 | Germany | Jan. 22, 1932 |